US011071152B2

(12) United States Patent
Wang et al.

(10) Patent No.: US 11,071,152 B2
(45) Date of Patent: Jul. 20, 2021

(54) ACCESS BARRING AND RADIO RESOURCE CONTROL CONNECTION IN NEW RADIO TO LONG-TERM EVOLUTION VOICE FALLBACK

(71) Applicant: QUALCOMM Incorporated, San Diego, CA (US)

(72) Inventors: Min Wang, San Diego, CA (US); Xipeng Zhu, San Diego, CA (US); Masato Kitazoe, Tokyo (JP); Lenaig Genevieve Chaponniere, La Jolla, CA (US); Zhong Ren, San Diego, CA (US); Xinli Song, San Diego, CA (US); Tom Chin, San Diego, CA (US); Osama Lotfallah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/781,535

(22) Filed: Feb. 4, 2020

(65) Prior Publication Data

US 2020/0260504 A1 Aug. 13, 2020

Related U.S. Application Data

(60) Provisional application No. 62/804,598, filed on Feb. 12, 2019.

(51) Int. Cl.
*H04W 76/10* (2018.01)
*H04W 48/02* (2009.01)
*H04W 36/00* (2009.01)

(52) U.S. Cl.
CPC ....... *H04W 76/10* (2018.02); *H04W 36/0022* (2013.01); *H04W 48/02* (2013.01)

(58) Field of Classification Search
CPC . H04W 80/04; H04W 36/18; H04W 36/0011; H04W 36/14; H04W 36/08;
(Continued)

(56) References Cited

U.S. PATENT DOCUMENTS

2010/0113010 A1* 5/2010 Tenny .................... H04L 47/10 455/423
2010/0279648 A1* 11/2010 Song .................... H04W 76/50 455/404.1
(Continued)

OTHER PUBLICATIONS

3GPP: "5G; System Architecture for the 5G System (3GPP TS 23.501 version 15.4.0 Release 15)", Dec. 18, 2018 (Dec. 18, 2018), pp. 1-235, XP055585888, Retrieved from the Internet: URL: https://www.etsi.org/deliver/ etsi_ts/123500_123599/123501/15.04.00_60/ts_123501v150400p.pdf, [retrieved on May 6, 2019], paragraphs [5.2.1]-[5.2.6], [5.15.5.2.1], [5.15.9], [5.16.3.8.2]-paragraphs [5.16.3.10]-[5.16.4.11].
(Continued)

*Primary Examiner* — Brenda H Pham
(74) *Attorney, Agent, or Firm* — Harrity & Harrity, LLP/Qualcomm

(57) ABSTRACT

Various aspects of the present disclosure generally relate to wireless communication. In some aspects, a user equipment (UE) may identify that a radio resource control connection is to be established for evolved packet system fallback or inter radio access technology fallback from New Radio for a voice call. The UE may determine that an establishment cause received from a network access stratum (NAS) layer does not indicate high priority access. The UE may override the establishment cause such that the establishment cause indicates a mobile originated (MO) voice call based at least in part on determining that the establishment cause received from the NAS layer does not indicate high priority access. The UE may perform an access barring check of an MO
(Continued)

800

810 Identify that an RRC connection is to be established for EPS fallback or inter RAT fallback from NR for a voice call 820 Determine, based at least in part on identifying that the RRC connection is to be established for EPS fallback or inter RAT fallback from NR for the voice call, that an establishment cause received from a NAS layer does not indicate high priority access 830 Override the establishment cause such that the establishment cause indicates a MO voice call based at least in part on determining that the establishment cause received from the NAS layer does not indicate high priority access voice call based at least in part on overriding the establishment cause such that the establishment cause indicates an MO voice call. Numerous other aspects are provided.

20 Claims, 10 Drawing Sheets

(58) Field of Classification Search
CPC ..... H04W 36/16; H04W 76/15; H04W 76/16; H04W 76/10
See application file for complete search history.

(56) References Cited

U.S. PATENT DOCUMENTS

| | | | | |
|---|---|---|---|---|
| 2014/0113636 | A1* | 4/2014 | Lee | H04W 76/16<br>455/437 |
| 2018/0368099 | A1* | 12/2018 | Chen | H04W 48/18 |

OTHER PUBLICATIONS

"5G; Procedures for the 5G System (3GPP TS 23.502 version 15.3.0 Release 15)", ETSI Technical Specification, European Telecommunications Standards Institute (ETSI), 650, Route Des Lucioles, F-06921 Sophia-Antipolis, France, vol. 3GPP SA, No. V15.3.0, Sep. 27, 2018 (Sep. 27, 2018), pp. 1-329, XP014329573, Retrieved from the Internet: URL: http://www.etsi.org/deliver/etsi_ts/123500_123599/123502/15.03.00_60/ts_123502v150300p.pdf, [retrieved on Sep. 27, 2018], paragraphs [4.13.6.1]-[0002], [5.2.2.2.13].

International Search Report and Written Opinion—PCT/US2020/016811—ISAEPO—dated May 14, 2020.

* cited by examiner

ACCESS BARRING AND RADIO RESOURCE CONTROL CONNECTION IN NEW RADIO TO LONG-TERM EVOLUTION VOICE FALLBACK

CROSS-REFERENCE TO RELATED APPLICATION

This application claims priority to U.S. Provisional Patent Application No. 62/804,598, filed on Feb. 12, 2019, entitled "ACCESS BARRING AND RADIO RESOURCE CONTROL CONNECTION IN NEW RADIO TO LONG-TERM EVOLUTION VOICE FALLBACK," which is hereby expressly incorporated by reference herein.

FIELD OF THE DISCLOSURE

Aspects of the present disclosure generally relate to wireless communication, and more particularly to techniques and apparatuses for access barring and radio resource control (RRC) connection in New Radio (NR) to long-term evolution (LTE) voice fallback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include identifying that a radio resource control (RRC) connection is to be established for evolved packet system (EPS) fallback or inter radio access technology (RAT) fallback from New Radio (NR) for a voice call; determining, based at least in part on identifying that the RRC connection is to be established for EPS fallback or inter RAT fallback from NR for the voice call, whether a system information block (SIB) includes an indication that access barring for multimedia telephony (MMTel) services is to be skipped; and selectively determining that access by the UE in association with establishing the RRC connection is not barred when the SIB includes the indication, or performing, based at least in part on an access barring parameter for mobile originated (MO) signaling, an access barring check when the SIB does not include the indication.

In some aspects, a UE for wireless communication may include memory and one or more processors operatively coupled to the memory. The memory and the one or more processors may be configured to: identify that an RRC connection is to be established for EPS fallback or inter RAT fallback from NR for a voice call; determine, based at least in part on identifying that the RRC connection is to be established for EPS fallback or inter RAT fallback from NR for the voice call, whether a SIB includes an indication that access barring for MMTel services is to be skipped; and selectively determine that access by the UE in association with establishing the RRC connection is not barred when the SIB includes the indication, or performing, based at least in part on an access barring parameter for MO signaling, an access barring check when the SIB does not include the indication.

In some aspects, a non-transitory computer-readable medium may store one or more instructions for wireless communication. The one or more instructions, when executed by one or more processors of a UE, may cause the one or more processors to: identify that an RRC connection is to be established for EPS fallback or inter RAT fallback from NR for a voice call; determine, based at least in part on identifying that the RRC connection is to be established for EPS fallback or inter RAT fallback from NR for the voice call, whether a SIB includes an indication that access barring for MMTel services is to be skipped; and selectively determine that access by the UE in association with establishing the RRC connection is not barred when the SIB includes the indication, or performing, based at least in part on an access barring parameter for MO signaling, an access barring check when the SIB does not include the indication.

In some aspects, an apparatus for wireless communication may include means for identifying that an RRC connection is to be established for EPS fallback or inter RAT fallback from NR for a voice call; means for determining, based at least in part on identifying that the RRC connection is to be established for EPS fallback or inter RAT fallback from NR for the voice call, whether a SIB includes an indication that access barring for MMTel services is to be skipped; and means for selectively determining that access by the apparatus in association with establishing the RRC connection is not barred when the SIB includes the indication, or performing, based at least in part on an access barring parameter for MO signaling, an access barring check when the SIB does not include the indication.

In some aspects, a method of wireless communication, performed by a UE, may include identifying that an RRC connection is to be established for EPS fallback or inter RAT fallback from NR for a voice call; determining, based at least in part on identifying that the RRC connection is to be established for EPS fallback or inter RAT fallback from NR for the voice call, whether a SIB includes an indication that access barring for voice fallback from NR is to be skipped; and selectively determining that access by the UE in association with establishing the RRC connection is not barred when the SIB includes the indication, or performing an access barring check when the SIB does not include the indication, wherein the access barring check is performed using an access barring parameter for voice service fallback from NR or an access barring parameter for MO signaling.

In some aspects, a UE for wireless communication may include memory and one or more processors operatively coupled to the memory. The memory and the one or more processors may be configured to identify that an RRC connection is to be established for EPS fallback or inter RAT fallback from NR for a voice call; determine, based at least in part on identifying that the RRC connection is to be established for EPS fallback or inter RAT fallback from NR for the voice call, whether a SIB includes an indication that access barring for voice fallback from NR is to be skipped; and selectively determine that access by the UE in association with establishing the RRC connection is not barred when the SIB includes the indication, or performing an access barring check when the SIB does not include the indication, wherein the access barring check is performed using an access barring parameter for voice service fallback from NR or an access barring parameter for MO signaling.

In some aspects, a non-transitory computer-readable medium may store one or more instructions for wireless communication. The one or more instructions, when executed by one or more processors of a UE, may cause the one or more processors to: identify that an RRC connection is to be established for EPS fallback or inter RAT fallback from NR for a voice call; determine, based at least in part on identifying that the RRC connection is to be established for EPS fallback or inter RAT fallback from NR for the voice call, whether a SIB includes an indication that access barring for voice fallback from NR is to be skipped; and selectively determine that access by the UE in association with establishing the RRC connection is not barred when the SIB includes the indication, or performing an access barring check when the SIB does not include the indication, wherein the access barring check is performed using an access barring parameter for voice service fallback from NR or an access barring parameter for MO signaling.

In some aspects, an apparatus for wireless communication may include means for identifying that an RRC connection is to be established for EPS fallback or inter RAT fallback from NR for a voice call; means for determining, based at least in part on identifying that the RRC connection is to be established for EPS fallback or inter RAT fallback from NR for the voice call, whether a SIB includes an indication that access barring for voice fallback from NR is to be skipped; and means for selectively determining that access by the apparatus in association with establishing the RRC connection is not barred when the SIB includes the indication, or performing an access barring check when the SIB does not include the indication, wherein the access barring check is performed using an access barring parameter for voice service fallback from NR or an access barring parameter for MO signaling.

In some aspects, a method of wireless communication, performed by a UE, may include identifying that an RRC connection is to be established for EPS fallback or inter RAT fallback from NR for a voice call; determining, based at least in part on identifying that the RRC connection is to be established for EPS fallback or inter RAT fallback from NR for the voice call, that an establishment cause received from a NAS layer does not indicate high priority access; and overriding the establishment cause such that the establishment cause indicates an MO voice call based at least in part on determining that the establishment cause received from the NAS layer does not indicate high priority access.

In some aspects, a UE for wireless communication may include memory and one or more processors operatively coupled to the memory. The memory and the one or more processors may be configured to identify that an RRC connection is to be established for EPS fallback or inter RAT fallback from NR for a voice call; determine, based at least in part on identifying that the RRC connection is to be established for EPS fallback or inter RAT fallback from NR for the voice call, that an establishment cause received from a NAS layer does not indicate high priority access; and override the establishment cause such that the establishment cause indicates an MO voice call based at least in part on determining that the establishment cause received from the NAS layer does not indicate high priority access.

In some aspects, a non-transitory computer-readable medium may store one or more instructions for wireless communication. The one or more instructions, when executed by one or more processors of a UE, may cause the one or more processors to: identify that an RRC connection is to be established for EPS fallback or inter RAT fallback from NR for a voice call; determine, based at least in part on identifying that the RRC connection is to be established for EPS fallback or inter RAT fallback from NR for the voice call, that an establishment cause received from a NAS layer does not indicate high priority access; and override the establishment cause such that the establishment cause indicates an MO voice call based at least in part on determining that the establishment cause received from the NAS layer does not indicate high priority access.

In some aspects, an apparatus for wireless communication may include means for identifying that an RRC connection is to be established for EPS fallback or inter RAT fallback from NR for a voice call; means for determining, based at least in part on identifying that the RRC connection is to be established for EPS fallback or inter RAT fallback from NR for the voice call, that an establishment cause received from a NAS layer does not indicate high priority access; and means for overriding the establishment cause such that the establishment cause indicates an MO voice call based at least in part on determining that the establishment cause received from the NAS layer does not indicate high priority access.

In some aspects, a method of wireless communication, performed by a UE, may include identifying that an RRC connection is to be established for EPS fallback or inter RAT fallback from NR for a voice call; and receiving, from a NAS layer and based at least in part on identifying that the RRC connection is to be established for EPS fallback or inter RAT fallback from NR for the voice call, information that identifies: a call type of the voice call as an EPS fallback or inter RAT fallback for voice, and an establishment cause, associated with the RRC connection, indicating an MO voice call.

In some aspects, a UE for wireless communication may include memory and one or more processors operatively coupled to the memory. The memory and the one or more processors may be configured to identify that an RRC connection is to be established for EPS fallback or inter RAT fallback from NR for a voice call; and receive, from a NAS layer and based at least in part on identifying that the RRC connection is to be established for EPS fallback or inter RAT fallback from NR for the voice call, information that identifies: a call type of the voice call as an EPS fallback or inter RAT fallback for voice, and an establishment cause, associated with the RRC connection, indicating an MO voice call.

In some aspects, a non-transitory computer-readable medium may store one or more instructions for wireless communication. The one or more instructions, when executed by one or more processors of a UE, may cause the one or more processors to: identify that an RRC connection is to be established for EPS fallback or inter RAT fallback from NR for a voice call; and receive, from a NAS layer and based at least in part on identifying that the RRC connection is to be established for EPS fallback or inter RAT fallback from NR for the voice call, information that identifies: a call type of the voice call as an EPS fallback or inter RAT fallback for voice, and an establishment cause, associated with the RRC connection, indicating an MO voice call.

In some aspects, an apparatus for wireless communication may include means for identifying that an RRC connection is to be established for EPS fallback or inter RAT fallback from NR for a voice call; and means for receiving, from a NAS layer and based at least in part on identifying that the RRC connection is to be established for EPS fallback or inter RAT fallback from NR for the voice call, information that identifies: a call type of the voice call as an EPS fallback or inter RAT fallback for voice, and an establishment cause, associated with the RRC connection, indicating an MO voice call.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
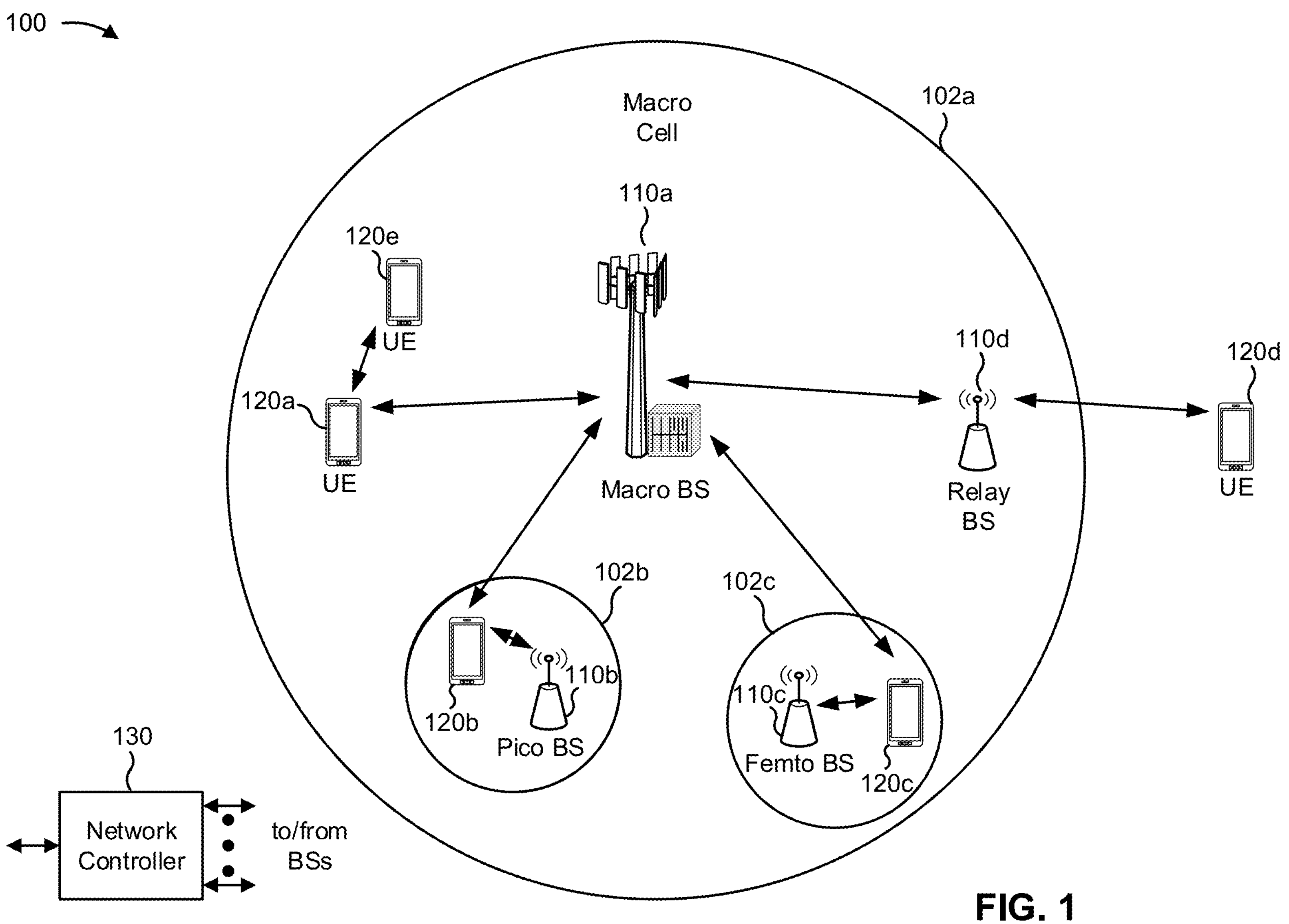
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. ABS is an entity that communicates with user equipment (UEs) and may also be referred to as a base station, an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
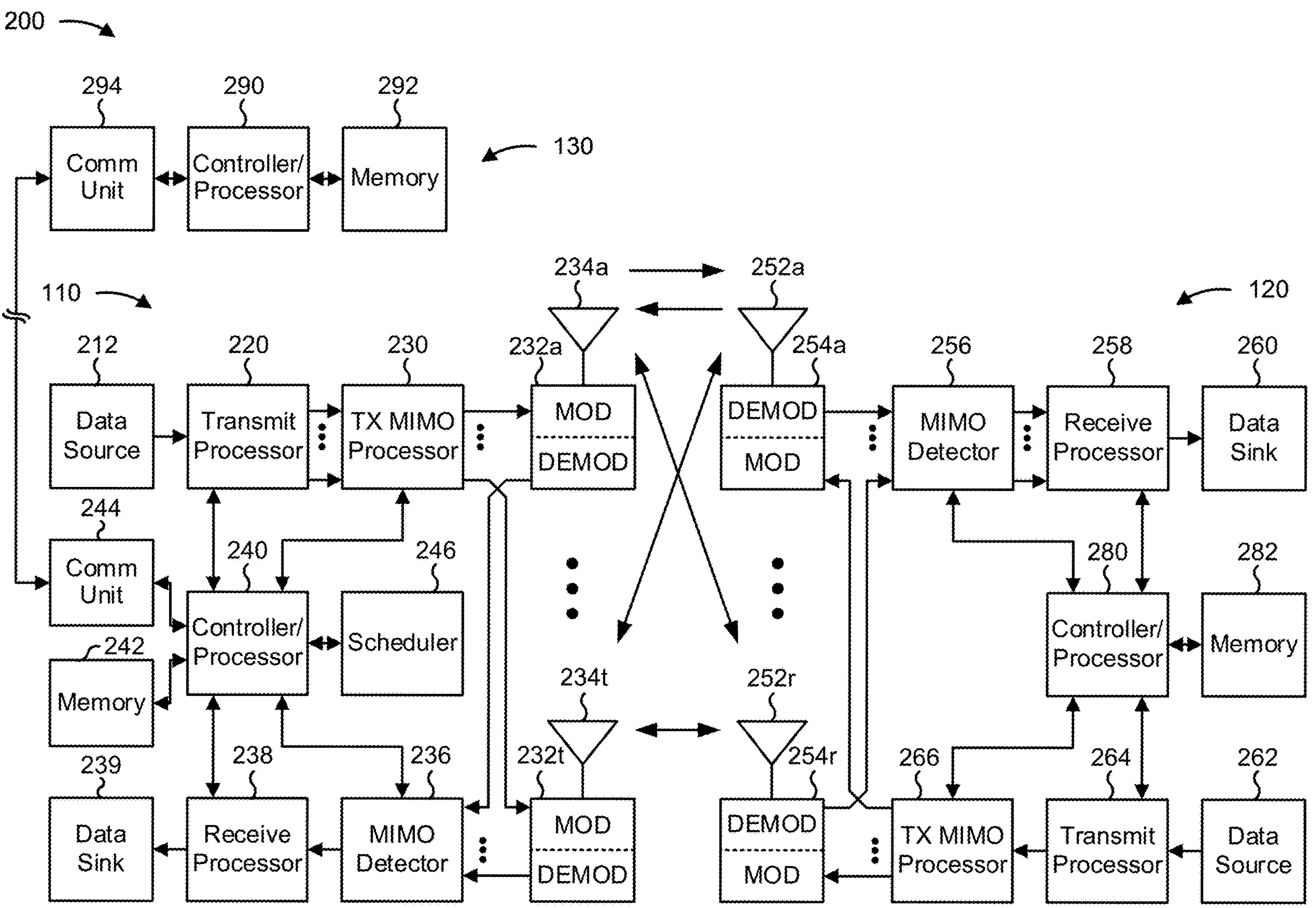
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with access barring and RRC connection in NR to LTE voice fallback, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 600 of FIG. 6, process 800 of FIG. 8, process 1000 of FIG. 10 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying that an RRC connection is to be established for EPS fallback or inter RAT fallback from NR for a voice call; means for determining, based at least in part on identifying that the RRC connection is to be established for EPS fallback or inter RAT fallback from NR for the voice call, whether a SIB includes an indication that access barring for MMTel services is to be skipped; means for selectively determining that access by UE 120 in association with establishing the RRC connection is not barred when the SIB includes the indication, or performing, based at least in part on an access barring parameter for MO signaling, an access barring check when the SIB does not include the indication; and/or the like. In some aspects, such means may include one or more components of UE 120 described in connection with FIG. 2.

In some aspects, UE 120 may include means for identifying that an RRC connection is to be established for EPS fallback or inter RAT fallback from NR for a voice call; means for determining, based at least in part on identifying that the RRC connection is to be established for EPS fallback or inter RAT fallback from NR for the voice call, whether a SIB includes an indication that access barring for voice fallback from NR is to be skipped; means for selectively determining that access by UE 120 in association with establishing the RRC connection is not barred when the SIB includes the indication, or performing an access barring check when the SIB does not include the indication, wherein the access barring check is performed using an access barring parameter for voice service fallback from NR or an access barring parameter for MO signaling; and/or the like. In some aspects, such means may include one or more components of UE 120 described in connection with FIG. 2.

In some aspects, UE 120 may include means for identifying that an RRC connection is to be established for EPS fallback or inter RAT fallback from NR for a voice call; means for determining, based at least in part on identifying that the RRC connection is to be established for EPS fallback or inter RAT fallback from NR for the voice call, that an establishment cause received from a NAS layer does not indicate high priority access; means for overriding the establishment cause such that the establishment cause indicates an MO voice call based at least in part on determining that the establishment cause received from the NAS layer does not indicate high priority access; and/or the like. In some aspects, such means may include one or more components of UE 120 described in connection with FIG. 2.

In some aspects, UE 120 may include means for identifying that an RRC connection is to be established for EPS fallback or inter RAT fallback from NR for a voice call; means for receiving, from a NAS layer and based at least in part on identifying that the RRC connection is to be established for EPS fallback or inter RAT fallback from NR for the voice call, information that identifies: a call type of the voice call as an EPS fallback or inter RAT fallback for voice, and an establishment cause, associated with the RRC connection, indicating an MO voice call; and/or the like. In some aspects, such means may include one or more components of UE 120 described in connection with FIG. 2.

As indicated above, FIG. 2 is provided as an example. Other examples may differ from what is described with regard to FIG. 2.

In a typical NR network, a gNB is unlikely to be optimized for supporting voice services. As a result, a 5G voice call (or a multimedia telephony (MMTel) call including voice) may be provided via evolved packet system (EPS) fallback or inter radio access technology (RAT) fallback. EPS fallback or inter RAT fallback is initiated by the gNB (e.g., upon determining that a voice call is to be initiated). However, due to the NR to LTE fallback process, a call setup time of the 5G voice call is longer than a call setup time for a 4G voice call (e.g., a voice over LTE (VoLTE) call, a video over LTE (ViLTE) call, and/or the like). Furthermore, a probability of a call setup failure during NR to LTE fallback is higher than a probability of a call setup failure of a typical 4G voice call. Minimizing the call setup delay and/or the likelihood of a call setup failure of a 5G voice call via fallback is important in order to improve performance, reduce wasted network resources, and improve user experience.

EPS fallback and inter RAT fallback involve procedures for LTE access barring checking (e.g., determining whether a UE is permitted to initiate an RRC connection) and establishment of an RRC connection (e.g., including identifying an establishment cause associated with establishing the RRC connection). As such, 3GPP standards should specify effective approaches for access barring checking and RRC connection establishment in the case of EPS fallback or inter RAT fallback for NR to LTE voice fallback. Moreover, 3GPP standards should define how the RRC layer and the network access stratum (NAS) layer perform EPS fallback or inter RAT fallback for voice fallback from NR. Some aspects described herein provide techniques and apparatuses for access barring and RRC connection establishment in NR to LTE voice fallback.

Figure 3:
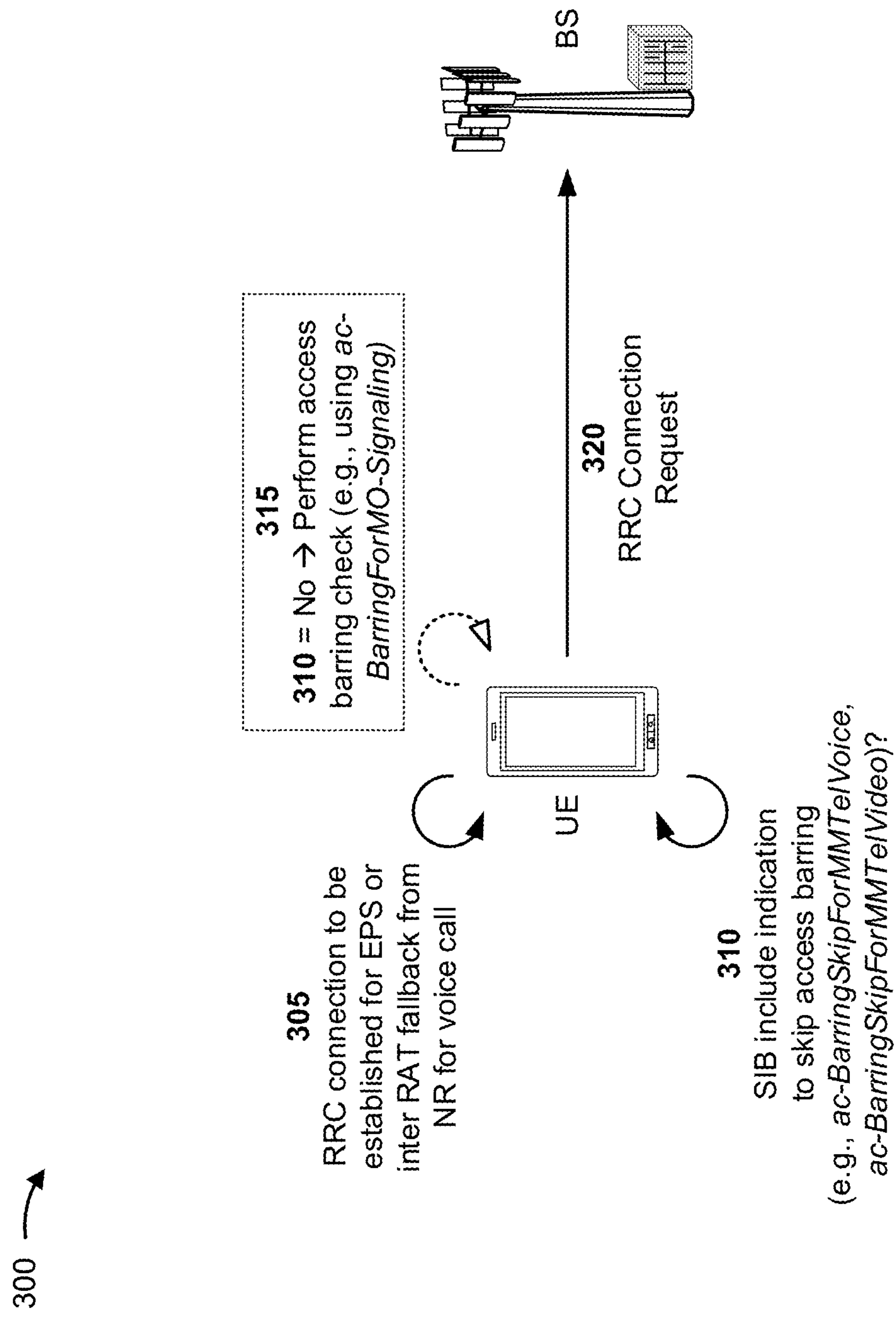
FIG. 3 is a diagram illustrating an example associated with access barring for NR to LTE voice fallback, in accordance with various aspects of the present disclosure.

FIG. 3 is a diagram illustrating an example 300 associated with access barring for NR to LTE voice fallback, in accordance with various aspects of the present disclosure.

As shown in FIG. 3, and by reference number 305, a UE (e.g., UE 120) may identify that an RRC connection is to be established for EPS fallback or inter RAT fallback (herein collectively referred to as EPS/RAT fallback) from NR for a voice call.

In some aspects, the UE may identify that an RRC connection is to be established for EPS/RAT fallback from NR for a voice call based at least in part on an indication provided by a gNB associated with an NR network. For example, when a voice call is initiated, the gNB may, as part of a redirection/handover procedure, provide (e.g., in an RRC release message) a voice fallback indication to the UE, wherein the voice fallback indication indicates that the redirection/handover was triggered by EPS/RAT fallback from NR for a voice call. Here, the UE can identify that the RRC connection is to be established for EPS/RAT fallback from NR for a voice call based at least in part on the indication. In some aspects, the voice fallback indication can be provided to, and received by, the UE in an RRC Release message, or another type of message, such as a MobilityFromNRCommand message.

Additionally, or alternatively, the UE may identify that the RRC connection is to be established for EPS/RAT fallback from NR for a voice call based at least in part on information associated with the UE. For example, an IMS layer of the UE can indicate to an access stratum of the UE that a voice call is being initiated, and the UE can determine, based at least in part on the indication, that the RRC connection is for EPS/RAT fallback from NR for a voice call based at least in part on the indication provided by the IMS layer.

As shown by reference number 310, the UE may determine whether a SIB includes an indication that access barring checking for MMTel services is to be skipped. For example, the UE may determine whether system information block type 2 (SIB2), received by the UE, includes an indication that access barring checking for MMTel services is to be skipped.

In some aspects, the UE may determine whether the SIB includes the indication based at least in part on identifying that an RRC connection is to be established for EPS/RAT fallback from NR for a voice call. For example, upon identifying that an RRC connection is to be established for EPS/RAT fallback from NR for a voice call, the UE may determine whether SIB2, received by the UE, includes an indication that access barring checking for MMTel services is to be skipped. As described below, when the SIB includes the indication, the UE may forego performance of access barring checking in association with establishing the RRC connection.

In some aspects, the indication may be associated with MMTel voice calls (e.g., the indication may be in the form of an ac-BarringSkipForWTelVoice parameter). Additionally, or alternatively, the indication may be associated with MMTel video calls (e.g., the indication may be in the form of an ac-BarringSkipForWTelVideo parameter).

In some aspects, the UE may (1) determine that access by the UE in association with establishing the RRC connection is not barred (when the SIB includes the indication), or (2) perform an access barring checking in association with determining whether UE access is barred (when the SIB does not include the indication).

For example, as shown by reference number 315, if the SIB does not include the indication that access barring checking is to be skipped (e.g., if SIB2 does not include ac-BarringSkipForWTelVoice or ac-BarringSkipForWTelVideo), then the UE may perform an access barring check. As shown in FIG. 3, in some aspects, the UE may perform the access barring check based at least in part on an access barring parameter for MO signaling (e.g., ac-BarringForMO-Signaling). Additionally, or alternatively, the UE may perform the access barring check based at least in part on an access barring parameter for service specific access control (SSAC) (e.g., ssac-BarringForMMTEL-Voice or ssac-BarringForWTEL-Video).

In some aspects, the access barring parameter for MO signaling is included in the SIB (e.g., SIB2). In some aspects, the access barring check is performed using a particular timer (e.g., time T306) as an access barring timer.

In some aspects, if the SIB includes the indication that access barring checking is to be skipped (e.g., if SIB2 includes ac-BarringSkipForWTelVoice or ac-BarringSkipForWTelVideo), then the UE may determine that access by the UE is not barred (e.g., without performing an access barring check).

In some aspects, as shown by reference number 320, the UE may transmit (e.g., to an eNB associated with the LTE network) an RRC connection request after the UE has determined the UE access is not barred. For example, when access barring checking is not skipped, the UE may transmit the RRC connection request when a result of the access barring check indicates that access by the UE is not barred. As another example, when access barring checking is skipped, the UE may transmit the RRC connection request (e.g., after determining that the SIB includes the indication that access barring checking can be skipped). The RRC connection can then be established for use for the voice call.

As indicated above, FIG. 3 is provided as an example. Other examples may differ from what is described with respect to FIG. 3.

Figure 4:
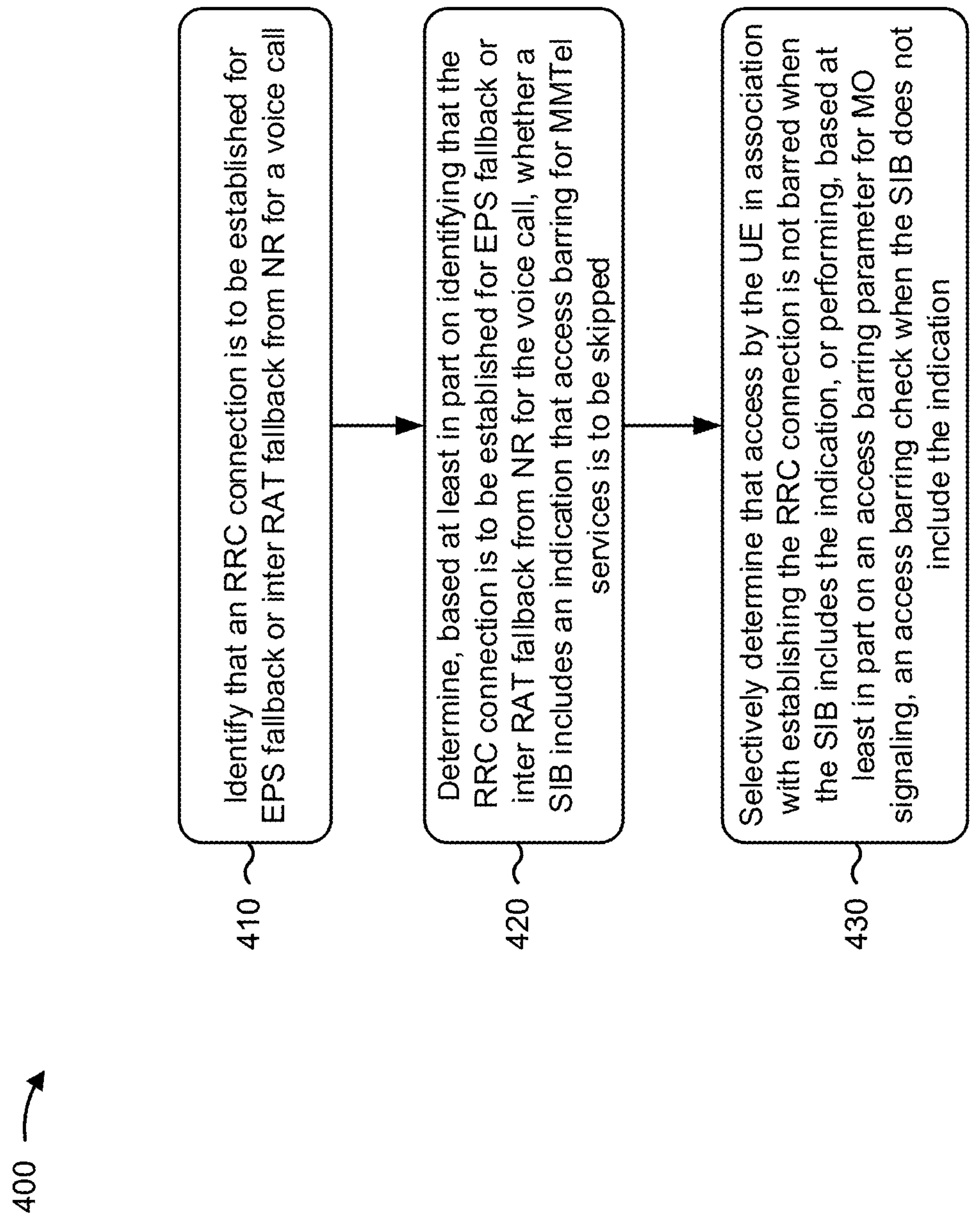
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with access barring for NR to LTE voice fallback.

As shown in FIG. 4, in some aspects, process 400 may include identifying that a radio resource control (RRC) connection is to be established for evolved packet system (EPS) fallback or inter radio access technology (RAT) fallback from new radio (NR) for a voice call (block 410). For example, the UE (e.g., using receive processor 258, transmit processor 264, controller/processor 280, memory 282, and/or the like) may identify that an RRC connection is to be established for EPS fallback or inter RAT fallback from NR for a voice call, as described above.

As further shown in FIG. 4, in some aspects, process 400 may include determining, based at least in part on identifying that the RRC connection is to be established for EPS fallback or inter RAT fallback from NR for the voice call, whether a system information block (SIB) includes an indication that access barring for multimedia telephony (MMTel) services is to be skipped (block 420). For example, the UE (e.g., using receive processor 258, transmit processor 264, controller/processor 280, memory 282, and/or the like) may determine, based at least in part on identifying that the RRC connection is to be established for EPS fallback or inter RAT fallback from NR for the voice call, whether a SIB includes an indication that access barring for MMTel services is to be skipped, as described above.

As further shown in FIG. 4, in some aspects, process 400 may include selectively determining that access by the UE in association with establishing the RRC connection is not barred when the SIB includes the indication, or performing, based at least in part on an access barring parameter for mobile originated (MO) signaling, an access barring check when the SIB does not include the indication (block 430). For example, the UE (e.g., using receive processor 258, transmit processor 264, controller/processor 280, memory 282, and/or the like) may selectively determine that access by the UE in association with establishing the RRC connection is not barred when the SIB includes the indication, or performing, based at least in part on an access barring parameter for MO signaling, an access barring check when the SIB does not include the indication, as described above.

Process 400 may include additional aspects, such as any single implementation or any combination of aspects described below and/or in connection with one or more other processes described elsewhere herein.

In a first aspect, the SIB is SIB type 2 (SIB2).

In a second aspect, alone or in combination with the first aspect, the access barring parameter for MO signaling is included in the SIB.

In some aspects, when the access barring check is performed, the access barring check is performed using timer T306 as an access barring timer.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
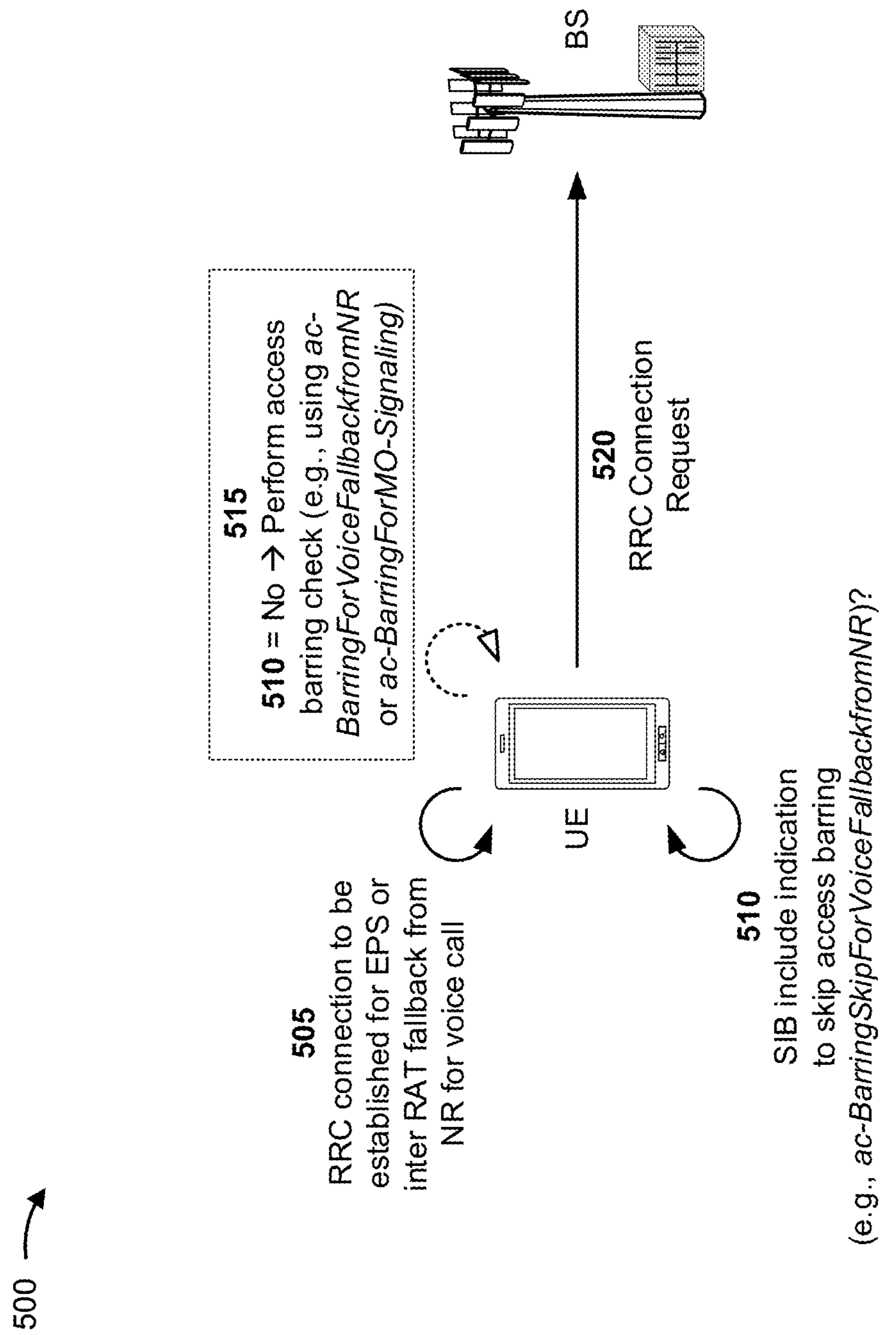
FIG. 5 is a diagram illustrating an example associated with access barring for NR to LTE voice fallback, in accordance with various aspects of the present disclosure.

FIG. 5 is a diagram illustrating an example 500 associated with access barring for NR to LTE voice fallback, in accordance with various aspects of the present disclosure.

As shown in FIG. 5, and by reference number 505, a UE (e.g., UE 120) may identify that an RRC connection is to be established for EPS/RAT fallback from NR for a voice call. In some aspects, the UE may identify that an RRC connection is to be established for EPS/RAT fallback from NR for a voice call in a manner similar to that described above in association with FIG. 3.

As shown by reference number 510, the UE may determine whether a SIB includes an indication that access barring checking for MMTel services is to be skipped. For example, the UE may determine whether SIB2, received by the UE, includes an indication that access barring checking for voice fallback from NR is to be skipped (e.g., whether SIB2 includes an ac BarringSkipForVoiceFallbackFromNR parameter).

In some aspects, the UE may determine whether the SIB includes the indication based at least in part on identifying that an RRC connection is to be established for EPS/RAT fallback from NR for a voice call. For example, upon identifying that an RRC connection is to be established for EPS/RAT fallback from NR for a voice call, the UE may determine whether SIB2, received by the UE, includes an indication that access barring checking for voice fallback from NR is to be skipped. As described below, when the SIB includes the indication, the UE may forego performance of access barring checking in association with establishing the RRC connection.

In some aspects, as indicated above, the indication may be associated with voice fallback from NR (e.g., the indication may be in the form of an ac-BarringSkipForVoiceFallback-FromNR parameter).

In some aspects, the UE may (1) determine that access by the UE in association with establishing the RRC connection is not barred (when the SIB includes the indication), or (2) perform an access barring checking in association with determining whether UE access is barred (when the SIB does not include the indication).

For example, as shown by reference number 515, if the SIB does not include the indication that access barring checking is to be skipped (e.g., if SIB2 does not include ac-BarringSkipForVoiceFallbackFromNR), then the UE may perform an access barring check. As shown in FIG. 5, in some aspects, the UE may perform the access barring check based at least in part on an access barring parameter for voice fallback from NR (e.g., ac-BarringForVoiceFall-backFromNR). In some aspects, the UE may perform the access barring check based at least in part on the access barring parameter voice fallback from NR when SIB2 includes the parameter for voice fallback from NR. In some aspects, if SIB2 does not include the parameter for voice fallback from NR (e.g., when ac-BarringForVoiceFallback-FromNR is not included in SIB2), then the UE may perform the access barring check based at least in part on an access barring parameter for MO signaling (e.g., ac-Bar-ringForMO-Signaling). In some aspects, the access barring parameter for MO signaling is included in the SIB. In some aspects, the access barring check is performed using a particular timer (e.g., time T306) as an access barring timer.

In some aspects, if the SIB includes the indication that access barring checking is to be skipped (e.g., if SIB2 includes ac-BarringSkipForVoiceFallbackFrom NR), then the UE may determine that access by the UE is not barred (e.g., without performing an access barring check).

In some aspects, as shown by reference number 520, the UE may transmit (e.g., to an eNB associated with the LTE network) an RRC connection request after the UE has determined the UE access is not barred. For example, when access barring checking is not skipped, the UE may transmit the RRC connection request when a result of the access barring check indicates that access by the UE is not barred. As another example, when access barring checking is skipped, the UE may transmit the RRC connection request (e.g., after determining that the SIB includes the indication that access barring checking can be skipped). The RRC connection can then be established for use for the voice call.

As indicated above, FIG. 5 is provided as an example. Other examples may differ from what is described with respect to FIG. 5.

Figure 6:
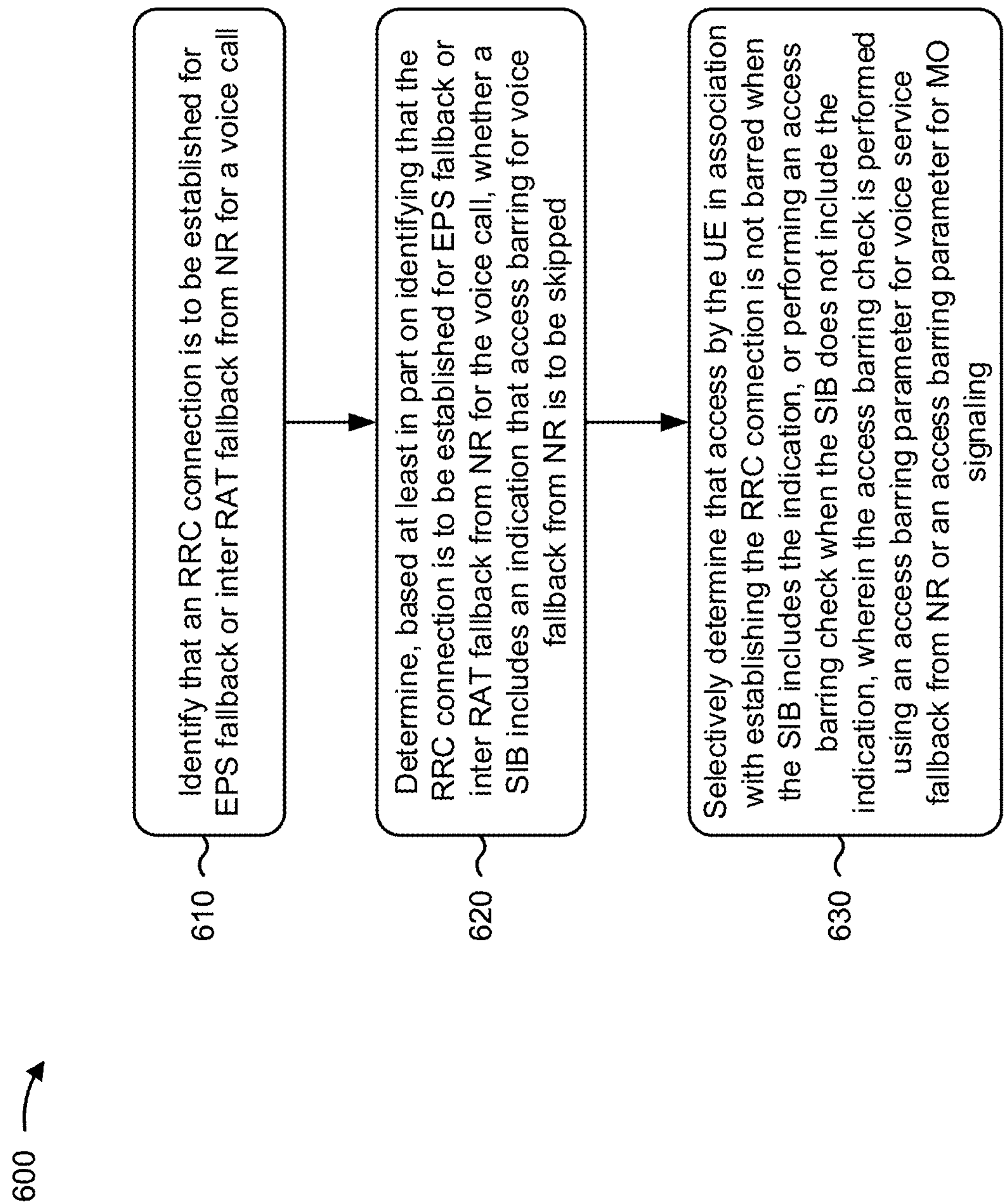
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) performs operations associated with access barring for NR to LTE voice fallback.

As shown in FIG. 6, in some aspects, process 600 may include identifying that an RRC connection is to be established for EPS fallback or inter RAT fallback from NR for a voice call (block 610). For example, the UE (e.g., using receive processor 258, transmit processor 264, controller/processor 280, memory 282, and/or the like) may identify that an RRC connection is to be established for EPS fallback or inter RAT fallback from NR for a voice call, as described above.

As further shown in FIG. 6, in some aspects, process 600 may include determining, based at least in part on identifying that the RRC connection is to be established for EPS fallback or inter RAT fallback from NR for the voice call, whether a SIB includes an indication that access barring for voice fallback from NR is to be skipped (block 620). For example, the UE (e.g., using receive processor 258, transmit processor 264, controller/processor 280, memory 282, and/or the like) may determine, based at least in part on identifying that the RRC connection is to be established for EPS fallback or inter RAT fallback from NR for the voice call, whether a SIB includes an indication that access barring for voice fallback from NR is to be skipped, as described above.

As further shown in FIG. 6, in some aspects, process 600 may include selectively determining that access by the UE in association with establishing the RRC connection is not barred when the SIB includes the indication, or performing an access barring check when the SIB does not include the indication (block 630). For example, the UE (e.g., using receive processor 258, transmit processor 264, controller/processor 280, memory 282, and/or the like) may selectively determine that access by the UE in association with establishing the RRC connection is not barred when the SIB includes the indication, or performing an access barring check when the SIB does not include the indication, as described above. In some aspects, the access barring check is performed using an access barring parameter for voice service fallback from NR or an access barring parameter for MO signaling.

Process 600 may include additional aspects, such as any single implementation or any combination of aspects described below and/or in connection with one or more other processes described elsewhere herein.

In a first aspect, the SIB is SIB type 2 (SIB2).

In a second aspect, alone or in combination with the first aspect, when the access barring check is performed, the access barring check is performed using timer T306 as an access barring timer.

In a third aspect, alone or in combination with any one or more of the first and second aspects, the access barring check is performed using the access barring parameter for voice service fallback from NR when the SIB includes the access barring parameter for voice service fallback from NR.

In a fourth aspect, alone or in combination with any one or more of the first through third aspects, the access barring check is performed using the access barring parameter for MO signaling when the SIB does not include the access barring parameter for voice service fallback from NR. In some aspects, the access barring parameter for MO signaling is included in the SIB.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
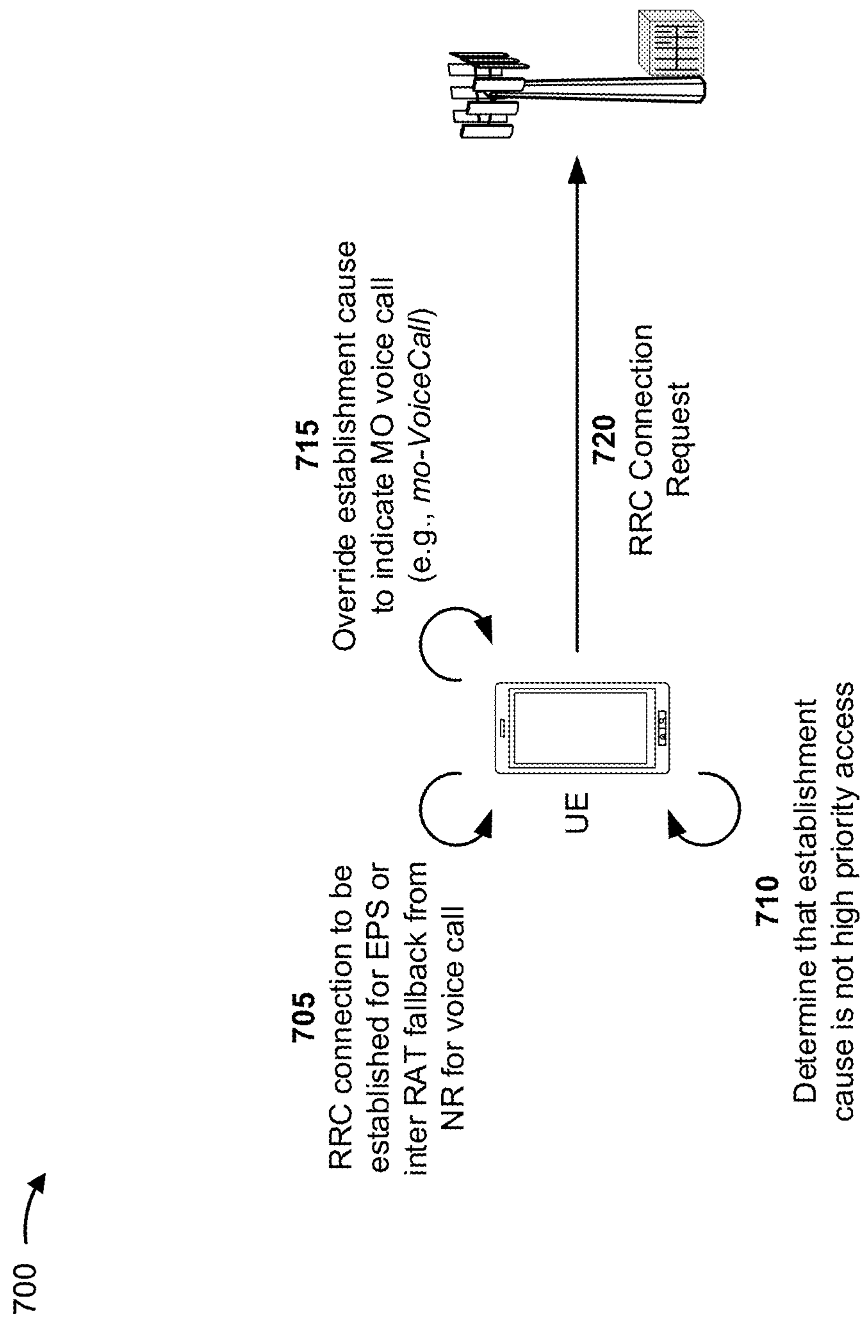
FIG. 7 is a diagram illustrating an example associated with RRC connection establishment for NR to LTE voice fallback, in accordance with various aspects of the present disclosure.

FIG. 7 is a diagram illustrating an example 700 associated with RRC connection establishment for NR to LTE voice fallback, in accordance with various aspects of the present disclosure.

As shown in FIG. 7, and by reference number 705, a UE (e.g., UE 120) may identify that an RRC connection is to be established for EPS/RAT fallback from NR for a voice call. In some aspects, the UE may identify that an RRC connection is to be established for EPS/RAT fallback from NR for a voice call in a manner similar to that described above in association with FIG. 3.

As shown by reference number 710, the UE may determine that an establishment cause, associated with the RRC connection and received from a NAS layer, does not indicate high priority access. For example, the UE may determine that a NAS layer, associated with the UE, has not set an establishment cause, associated with the UE, to high priority access (e.g., highPriorityAccess).

As shown by reference number 715, based at least in part on determining that the establishment cause received from the NAS layer does not indicate high priority access, the UE may override an establishment cause such that the establishment cause indicates an MO voice call (e.g., mo-VoiceCall). In other words, when the NAS layer has not set the establishment cause to high priority access, the UE may override the establishment cause such that the establishment cause indicates an MO voice call.

In some aspects, as shown by reference number 720, the UE may transmit (e.g., to an eNB associated with the LTE network) an RRC connection request, wherein the RRC connection request includes information that identifies the establishment cause indicating an MO voice call. For example, after overriding the establishment cause as described above, the UE may transmit an RRC connection request including information that identifies the establishment cause as being associated with an MO voice call (e.g., mo-VoiceCall). The RRC connection can then be established for use for the voice call.

In some aspects, the UE may perform an access barring check of an MO voice call based at least in part on overriding the establishment cause such that the establishment cause indicates an MO voice call. That is, in some aspects, the UE may, before transmitting the RRC connection request and based at least in part on identifying that an RRC connection is to be established for EPS/RAT fallback from NR for a voice call, determine whether access by the UE in association with establishing the RRC connection is barred, as described elsewhere herein. For example, the UE may perform an access barring check for an MO voice call (e.g., using one or more parameters associated with access barring for an MO voice call) and, if access is not barred, the UE may transmit the RRC connection request.

As indicated above, FIG. 7 is provided as an example. Other examples may differ from what is described with respect to FIG. 7.

Figure 8:
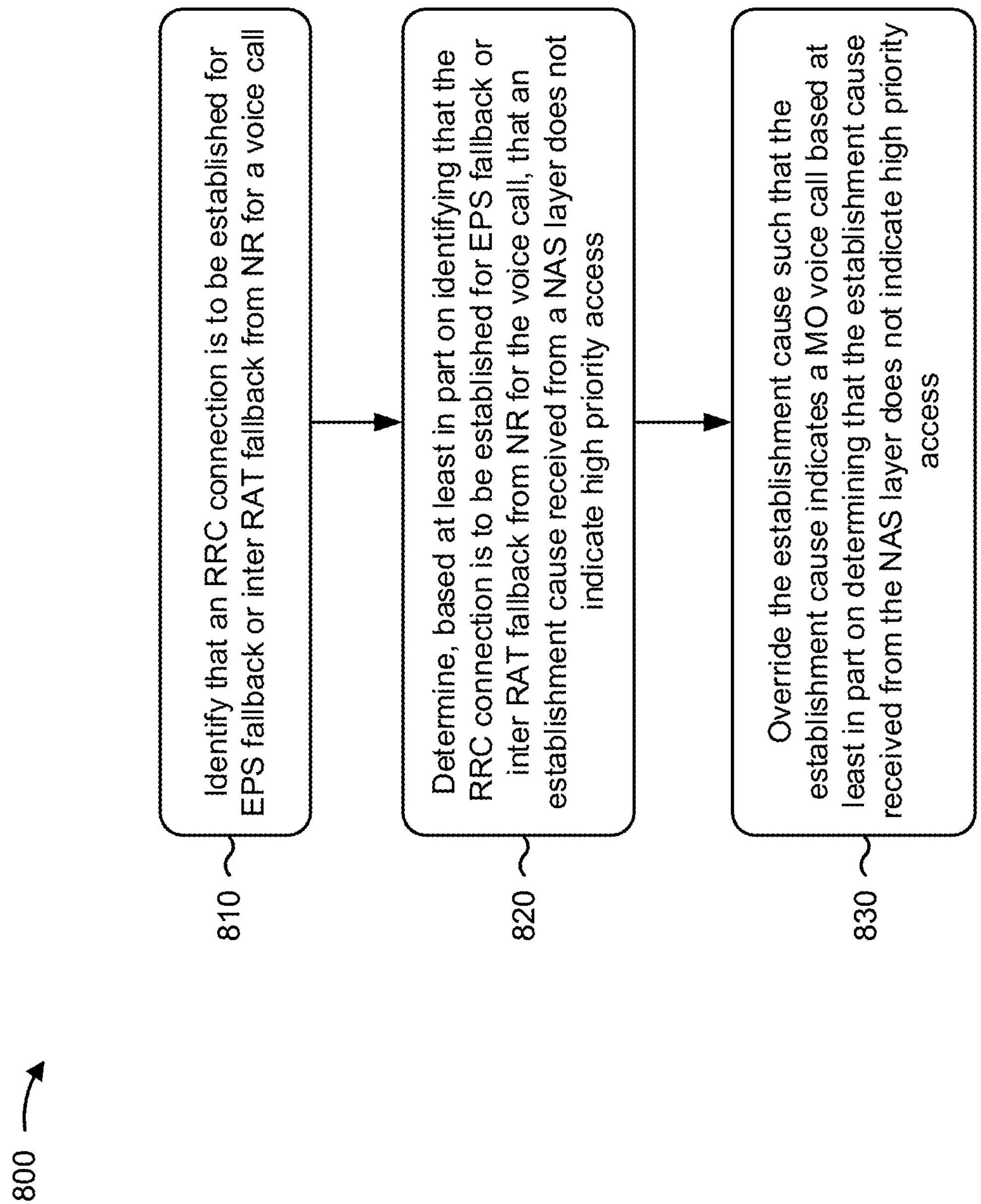
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations associated with RRC connection establishment for NR to LTE voice fallback.

As shown in FIG. 8, in some aspects, process 800 may include identifying that an RRC connection is to be established for EPS fallback or inter RAT fallback from NR for a voice call (block 810). For example, the UE (e.g., using receive processor 258, transmit processor 264, controller/processor 280, memory 282, and/or the like) may identify that an RRC connection is to be established for EPS fallback or inter RAT fallback from NR for a voice call, as described above.

As further shown in FIG. 8, in some aspects, process 800 may include determining, based at least in part on identifying that the RRC connection is to be established for EPS fallback or inter RAT fallback from NR for the voice call, that an establishment cause received from a NAS layer does not indicate high priority access (block 820). For example, the UE (e.g., using receive processor 258, transmit processor 264, controller/processor 280, memory 282, and/or the like) may determine, based at least in part on identifying that the RRC connection is to be established for EPS fallback or inter RAT fallback from NR for the voice call, that an establishment cause received from a NAS layer does not indicate high priority access, as described above.

As further shown in FIG. 8, in some aspects, process 800 may include overriding the establishment cause such that the establishment cause indicates an MO voice call based at least in part on determining that the establishment cause received from the NAS layer does not indicate high priority access (block 830). For example, the UE (e.g., using receive processor 258, transmit processor 264, controller/processor 280, memory 282, and/or the like) may override the establishment cause such that the establishment cause indicates an MO voice call based at least in part on determining that the establishment cause received from the NAS layer does not indicate high priority access, as described above.

Process 800 may include additional aspects, such as any single implementation or any combination of aspects described below and/or in connection with one or more other processes described elsewhere herein.

In a first aspect, an RRC connection request is transmitted.

In a second aspect, alone or in combination with the first aspect, the UE may determine that access by the UE in association with establishing the RRC connection is not barred when a SIB includes an indication that access barring for voice fallback from NR is to be skipped.

In a third aspect, alone or in combination with any one or more of the first and second aspects, the UE may perform an access barring check when a SIB does not include an indication that access barring for voice fallback from NR is to be skipped, wherein the access barring check is performed using an access barring parameter for voice service fallback from NR or an access barring parameter for MO signaling.

In a fourth aspect, alone or in combination with any one or more of the first through third aspects, the access barring check is performed using timer T306 as an access barring timer.

In a fifth aspect, alone or in combination with any one or more of the first through fourth aspects, the access barring check is performed using the access barring parameter for voice service fallback from NR when a SIB includes the access barring parameter for voice service fallback from NR.

In a sixth aspect, alone or in combination with any one or more of the first through fifth aspects, the access barring check is performed using the access barring parameter for MO signaling when a SIB does not include the access barring parameter for voice service fallback from NR.

In a seventh aspect, alone or in combination with any one or more of the first through sixth aspects, the access barring parameter for MO signaling is included in the SIB. In an eighth aspect, alone or in combination with any one or more of the first through seventh aspects, the access barring check is performed using one or more parameters associated with access barring for an MO voice call.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
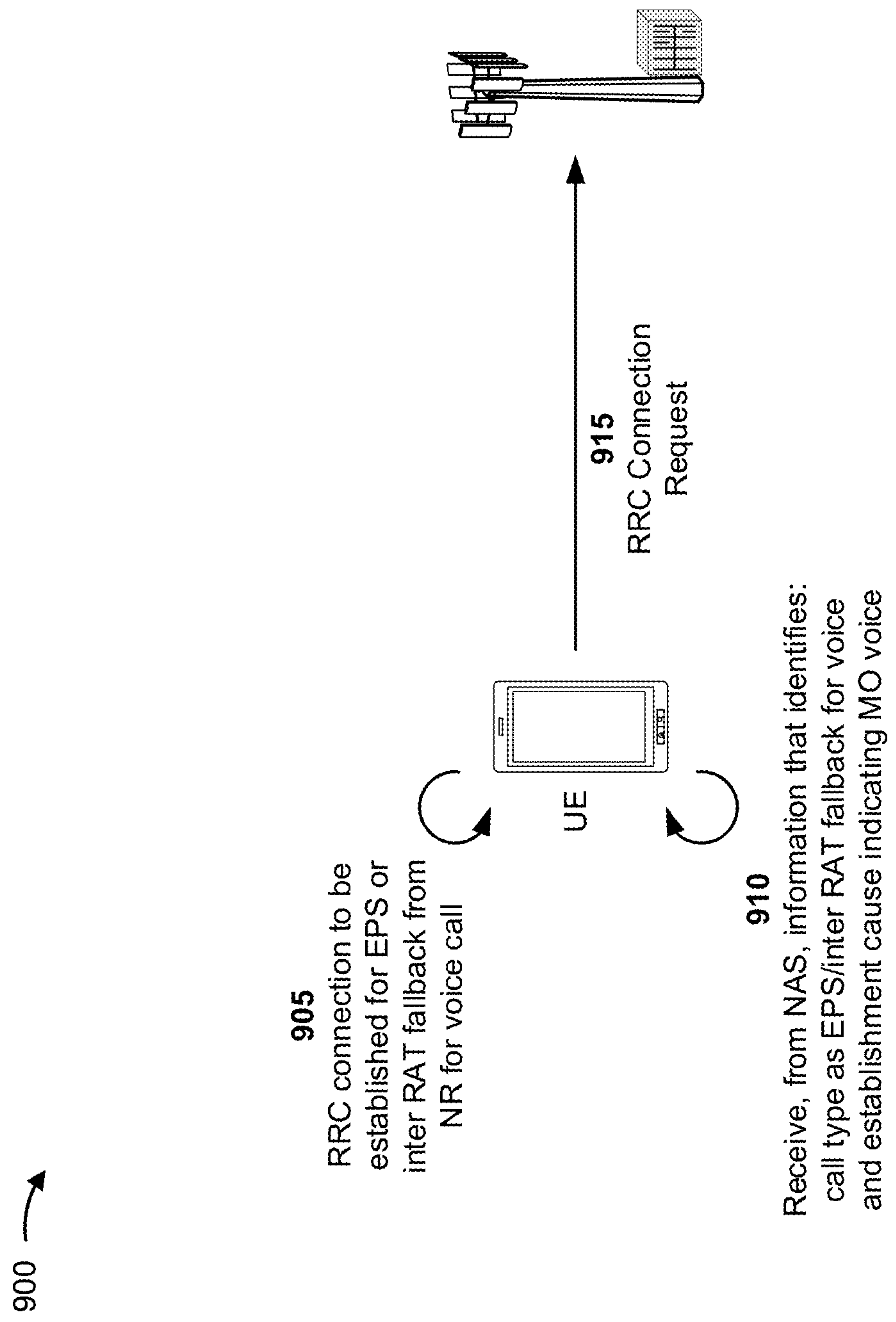
FIG. 9 is a diagram illustrating an example associated with RRC connection establishment for NR to LTE voice fallback, in accordance with various aspects of the present disclosure.

FIG. 9 is a diagram illustrating an example 900 associated with RRC connection establishment for NR to LTE voice fallback, in accordance with various aspects of the present disclosure.

As shown in FIG. 9, and by reference number 905, a UE (e.g., UE 120) may identify that an RRC connection is to be established for EPS/RAT fallback from NR for a voice call. In some aspects, the UE may identify that an RRC connection is to be established for EPS/RAT fallback from NR for a voice call in a manner similar to that described above in association with FIG. 3.

As shown by reference number 910, the UE may receive, from a NAS layer and based at least in part on identifying that the RRC connection is to be established for EPS/RAT fallback from NR for the voice call, information that identifies a call type of the voice call as an EPS fallback or inter RAT fallback for voice, and information that identifies an establishment cause, associated with the RRC connection, as indicating an MO voice call. For example, when RRC redirection based on voice fallback is used, a NAS layer of the UE may be configured to indicate, to an RRC layer of the UE, that a call type, associated with the voice call, is EPS/RAT fallback for a voice call, and that the establishment cause, associated with the RRC connection, is to be set to indicate an MO voice call.

In some aspects, as shown by reference number 915, the UE may transmit (e.g., to an eNB associated with the LTE network) an RRC connection request. In some aspects, the RRC connection request includes information that identifies the establishment cause indicating an MO voice call. In some aspects, the RRC connection request includes information that identifies the call type as a voice call associated with EPS/RAT fallback. For example, after receiving the information that identifies the call type and the information that identifies the establishment cause as described above, the UE may transmit an RRC connection request including information that identifies the call type and information that identifies the establishment cause as being associated with an MO voice call (e.g., mo-VoiceCall). The RRC connection can then be established for use for the voice call.

In some aspects, the UE may, before transmitting the RRC connection request and based at least in part on identifying that an RRC connection is to be established for EPS/RAT fallback from NR for a voice call, determine that access by the UE in association with establishing the RRC connection is not barred, as described elsewhere herein (e.g., when the SIB includes an indication to skip an access barring check, or after the UE performs an access barring check).

As indicated above, FIG. 9 is provided as an example. Other examples may differ from what is described with respect to FIG. 9.

Figure 10:
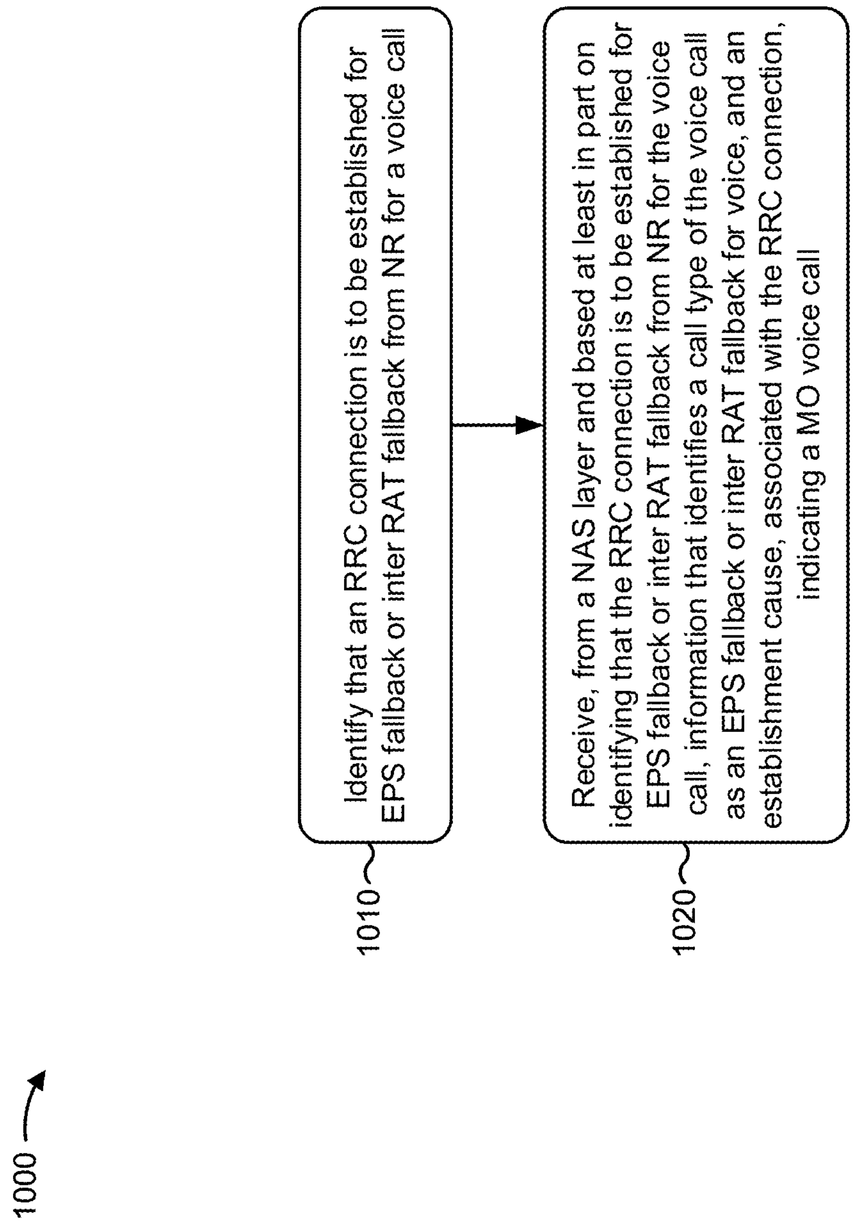
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with RRC connection establishment for NR to LTE voice fallback.

As shown in FIG. 10, in some aspects, process 1000 may include identifying that an RRC connection is to be established for EPS fallback or inter RAT fallback from NR for a voice call (block 1010). For example, the UE (e.g., using receive processor 258, transmit processor 264, controller/processor 280, memory 282, and/or the like) may identify that an RRC connection is to be established for EPS fallback or inter RAT fallback from NR for a voice call, as described above.

As further shown in FIG. 10, in some aspects, process 1000 may include receiving, from a NAS layer and based at least in part on identifying that the RRC connection is to be established for EPS fallback or inter RAT fallback from NR for the voice call, information that identifies a call type of the voice call as an EPS fallback or inter RAT fallback for voice and an establishment cause, associated with the RRC connection, indicating an MO voice call (block 1020). For example, the UE (e.g., using receive processor 258, transmit processor 264, controller/processor 280, memory 282, and/or the like) may receive, from a NAS layer and based at least in part on identifying that the RRC connection is to be established for EPS fallback or inter RAT fallback from NR for the voice call, information that identifies a call type of the voice call as an EPS fallback or inter RAT fallback for voice and an establishment cause, associated with the RRC connection, indicating an MO voice call, as described above.

Process 1000 may include additional aspects, such as any single implementation or any combination of aspects described below and/or in connection with one or more other processes described elsewhere herein.

In a first aspect, an RRC connection request is transmitted, wherein the RRC connection request includes information that identifies the establishment cause indicating an MO voice call.

In a second aspect, alone or in combination with the first aspect, the UE may determine that access by the UE in association with establishing the RRC connection is not barred when a system information block includes an indication that access barring for voice fallback from NR is to be skipped.

In a third aspect, alone or in combination with any one or more of the first and second aspects, process 1000 may include performing an access barring check when a SIB does not include an indication that access barring for voice fallback from NR is to be skipped, wherein the access barring check is performed using an access barring parameter for voice service fallback from NR or an access barring parameter for MO signaling.

In a fourth aspect, alone or in combination with any one or more of the first through third aspects, the SIB is SIB2.

In a fifth aspect, alone or in combination with any one or more of the first through fourth aspects, the access barring check is performed using timer T306 as an access barring timer.

In a sixth aspect, alone or in combination with any one or more of the first through fifth aspects, the access barring check is performed using the access barring parameter for voice service fallback from NR, when the SIB includes the access barring parameter for voice service fallback from NR.

In a seventh aspect, alone or in combination with any one or more of the first through sixth aspects, the access barring check is performed using the access barring parameter for MO signaling, when the SIB does not include the access barring parameter for voice service fallback from NR.

In an eighth aspect, alone or in combination with any one or more of the first through seventh aspects, the access barring parameter for MO signaling is included in the SIB.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

identifying that a radio resource control (RRC) connection is to be established for evolved packet system (EPS) fallback or inter radio access technology (RAT) fallback from new radio (NR) for a voice call;

determining, based at least in part on identifying that the RRC connection is to be established for EPS fallback or inter RAT fallback from NR for the voice call, that an establishment cause received from a network access stratum (NAS) layer does not indicate high priority access;

overriding the establishment cause such that the establishment cause indicates a mobile originated (MO) voice call based at least in part on determining that the establishment cause received from the NAS layer does not indicate high priority access; and performing an access barring check of an MO voice call based at least in part on overriding the establishment cause such that the establishment cause indicates an MO voice call.

2. The method of claim 1, wherein an RRC connection request is transmitted, wherein the RRC connection request includes information that identifies the establishment cause indicating an MO voice call.

3. The method of claim 2, wherein the RRC connection is established for use for the voice call based on the RRC connection request being transmitted.

4. The method of claim 1, wherein the access barring check is performed using one or more parameters associated with access barring for an MO voice call.

5. The method of claim 1, further comprising:

determining that access for an MO voice call is not barred based on performing the access barring check; and transmitting an RRC connection request based at least in part on determining that access for an MO voice call is not barred.

6. The method of claim 1, further comprising:

determining that a system information block (SIB) does not include an indication that the access barring check is to be skipped; and wherein performing the access barring check comprises:

performing the access barring check based at least in part on determining that the SIB does not include the indication.

7. The method of claim 1, wherein performing the access barring check comprises:

performing the access barring check based at least in part on one or more of:

an access barring parameter for MO signaling, an access barring parameter for service specific access control (SSAC), or an access barring parameter for voice service fallback from NR.

8. The method of claim 1, wherein performing the access barring check comprises:

performing the access barring check based at least in part on an access barring parameter for voice service fallback from NR when a system information block (SIB) includes the access barring parameter for voice service fallback from NR.

9. The method of claim 1, wherein performing the access barring check comprises:

performing the access barring check based at least in part on an access barring parameter for MO signaling when a system information block (SIB) does not include an access barring parameter for voice service fallback from NR.

10. A user equipment (UE) for wireless communication, comprising:

a memory; and one or more processors operatively coupled to the memory, the memory and the one or more processors configured to:

identify that a radio resource control (RRC) connection is to be established for evolved packet system (EPS) fallback or inter radio access technology (RAT) fallback from new radio (NR) for a voice call;

determine, based at least in part on identifying that the RRC connection is to be established for EPS fallback or inter RAT fallback from NR for the voice call, that an establishment cause received from a network access stratum (NAS) layer does not indicate high priority access;

override the establishment cause such that the establishment cause indicates a mobile originated (MO) voice call based at least in part on determining that the establishment cause received from the NAS layer does not indicate high priority access; and perform an access barring check of an MO voice call based at least in part on overriding the establishment cause such that the establishment cause indicates an MO voice call.

11. The UE of claim 10, wherein an RRC connection request is transmitted, wherein the RRC connection request includes information that identifies the establishment cause indicating an MO voice call.

12. The UE of claim 10, wherein the access barring check is performed using one or more parameters associated with access barring for an MO voice call.

13. The UE of claim 10, wherein the one or more processors, when performing the access barring check, are configured to:

perform the access barring check based at least in part on an access barring parameter for voice service fallback from NR when a system information block (SIB) includes the access barring parameter for voice service fallback from NR.

14. The UE of claim 10, wherein the one or more processors, when performing the access barring check, are configured to:

perform the access barring check based at least in part on an access barring parameter for MO signaling when a system information block (SIB) does not include an access barring parameter for voice service fallback from NR.

15. A non-transitory computer-readable medium storing a set of instructions for wireless communication, the set of instructions comprising:

one or more instructions that, when executed by one or more processors of a user equipment (UE), cause the UE to:

identify that a radio resource control (RRC) connection is to be established for evolved packet system (EPS) fallback or inter radio access technology (RAT) fallback from new radio (NR) for a voice call;

determine, based at least in part on identifying that the RRC connection is to be established for EPS fallback or inter RAT fallback from NR for the voice call, that an establishment cause received from a network access stratum (NAS) layer does not indicate high priority access;

override the establishment cause such that the establishment cause indicates a mobile originated (MO) voice call based at least in part on determining that the establishment cause received from the NAS layer does not indicate high priority access; and perform an access barring check of an MO voice call based at least in part on overriding the establishment cause such that the establishment cause indicates an MO voice call.

16. The non-transitory computer-readable medium of claim 15, wherein an RRC connection request is transmitted, wherein the RRC connection request includes information that identifies the establishment cause indicating an MO voice call.

17. The non-transitory computer-readable medium of claim 15, wherein the access barring check is performed using one or more parameters associated with access barring for an MO voice call.

18. An apparatus for wireless communication, comprising:

means for identifying that a radio resource control (RRC) connection is to be established for evolved packet system (EPS) fallback or inter radio access technology (RAT) fallback from new radio (NR) for a voice call;

means for determining, based at least in part on identifying that the RRC connection is to be established for EPS fallback or inter RAT fallback from NR for the voice call, that an establishment cause received from a network access stratum (NAS) layer does not indicate high priority access;

means for overriding the establishment cause such that the establishment cause indicates a mobile originated (MO) voice call based at least in part on determining that the establishment cause received from the NAS layer does not indicate high priority access; and means for performing an access barring check of an MO voice call based at least in part on overriding the establishment cause such that the establishment cause indicates an MO voice call.

19. The apparatus of claim 18, wherein an RRC connection request is transmitted, wherein the RRC connection request includes information that identifies the establishment cause indicating an MO voice call.

20. The apparatus of claim 18, wherein the access barring check is performed using one or more parameters associated with access barring for an MO voice call.

* * * * *